United States Patent [19]

Mashimo et al.

[11] Patent Number: 4,498,891
[45] Date of Patent: Feb. 12, 1985

[54] DRIVE BELT WITH TENSILE CORDS

[75] Inventors: Satoshi Mashimo, Akashi; Masayuki Tanaka, Kobe; Takashi Kinoshita, Hyogo, all of Japan

[73] Assignee: Mitsuboshi Belting Ltd., Kobe, Japan

[21] Appl. No.: 463,805

[22] Filed: Feb. 4, 1983

[30] Foreign Application Priority Data

Feb. 5, 1982 [JP] Japan .............................. 57-15334[U]

[51] Int. Cl.³ .............................................. F16G 1/04
[52] U.S. Cl. .................................... 474/205; 474/268; 57/902
[58] Field of Search ............... 474/204, 205, 250, 251, 474/268; 156/137, 138, 139; 57/211, 230, 231, 210, 902

[56] References Cited

U.S. PATENT DOCUMENTS

| | | | |
|---|---|---|---|
| 2,739,090 | 3/1956 | Waugh | 57/902 |
| 3,597,303 | 8/1971 | Tanaka | 57/902 X |
| 3,603,071 | 9/1971 | O'Neil | 57/902 |
| 3,607,499 | 9/1971 | Garbin | 156/137 |
| 3,621,727 | 11/1971 | Cicognani | 474/205 |
| 3,930,418 | 1/1976 | Dutton | 156/139 X |
| 3,937,094 | 2/1976 | Cicognani | 474/205 |
| 4,016,325 | 4/1977 | Flautt et al. | 57/902 |
| 4,266,937 | 5/1981 | Tanako | 474/205 |
| 4,305,714 | 12/1981 | Renshaw | 474/250 |

FOREIGN PATENT DOCUMENTS

| | | | |
|---|---|---|---|
| 576071 | 5/1959 | Canada | 154/4 |
| 2523859 | 12/1975 | Fed. Rep. of Germany | 474/205 |
| 12172 | 2/1975 | Japan | 156/139 |

Primary Examiner—Stephen J. Novosad
Assistant Examiner—Bruce M. Kisliuk
Attorney, Agent, or Firm—Wood, Dalton, Phillips, Mason & Rowe

[57] ABSTRACT

A drive belt manufacture wherein tensile cords (16) are provided with a Lang twist having a ply twist constant of approximately 2.9 to 3.9 and a cable twist constant of approximately one-fifth to one-half of the ply twist constant. In a preferred embodiment, the tensile cords are formed of aromatic polyamide fibers and are provided with an adhesive coating from a solution of resorcinol, formalin, and latex rubber. The invention further comprehends subjecting the cords to a pretreatment of such an adhesive solution, an epoxy resin, or an isocyanate compound. The resultant twisted cords provide improved long life characteristics for use in drive belts and the like.

24 Claims, 3 Drawing Figures

TEST SAMPLE

DRIVE BELT WITH TENSILE CORDS

DESCRIPTION

1. Technical Field

This invention relates to drive belts, and in particular to power transmission and timing belts.

2. Background Art

It is conventional in the forming of drive belts to provide in the belt body longitudinally extending tensile cords. The tensile cords provide strength in the longitudinal direction of the belt effectively preventing undesirable stretch of the belt, while yet permitting ready flexibility of the belt for improved drive engagement with the pulleys of the drive system.

One form of such tensile cord which has been found to be advantageous in such applications is the tensile cord formed of aromatic polyamide fibers. One example of such fibers are those manufactured under the trademark Kevlar ®.

A problem arises, however, in the use of such aromatic polyamide fiber tensile cords in that exposed ends of the tensile cords tend to break into fibrils, i.e. ravel. The raveled fibers present a serious problem in such drive systems in that the raveled fibers tend to get caught in the pulleys and other parts of the mechanism, tending to shorten the useful life of the belt.

In an effort to prevent such raveling, a number of different methods of treatment of the tensile cords have been attempted. Illustratively, one attempted solution to the problem has been to apply an adhesive solution formed of resorcinol-formalin-latex to the cords. Such a treatment with the resorcinol-formalin-latex combination (hereinafter referred to as RFL solution) has been utilized subsequent to a pretreatment with an epoxy or isocyanate compound. Such treatment of the cords has been effected following subjection of the fibers to Lang twist at a ply twist constant of 2.8 or lower.

Where the Lang twist has been applied without pretreatment of the cords to the epoxy or isocyanate compound, flexibility is satisfactory but the raveling tendency continues. Where the cords are subjected to the pretreatment before given the indicated Lang twist, the fibers become so rigid and hard that the flexibility of the belt is insufficient and, thus, the belt is unsatisfactory even though there is less tendency for the fibers of the tensile cords to ravel.

Where a single twist was applied to the tensile cord fibers prior to the RFL solution treatment, the fibers tended to undesirably ravel and, thus, this method was found to be unsatisfactory.

DISCLOSURE OF THE INVENTION

The present invention comprehends an improved drive belt manufacture wherein the tensile cords are provided with a Lang twist wherein the ply twist constant is in the range of approximately 2.9 to 3.9 (i.e. 2.9 to 3.9 turns per decimeter) and the cable twist constant is in the range of approximately 0.20 to 0.50 of the ply twist constant. More specifically, the invention comprehends the forming of the tensile cords with such Lang twists of aromatic polyamide synthetic resin fibers, glass fibers, polyester synthetic fibers, nylon fibers, etc.

In the illustrated embodiment, the tensile cords are provided with an outer coating comprising a mixture of chloroprene latex, resorcinol, and formalin.

In one embodiment, the tensile cords are provided with a first coating of an epoxy synthetic resin.

In another form of the invention, the tensile cords are provided with a first coating of an isocyanate compound.

In another form of the invention, the tensile cords are provided with a first coating with a mixture of chloroprene latex, resorcinol and formalin, and a subsequent outer coating of the same material.

The invention comprehends the provision of an adhesive material on the Lang-twisted cords to provide high adhesion of the cords to the belt body.

In one improved embodiment of the invention, the ply twist constant of the Lang twist was approximately 3 and the cable twist constant was approximately 1.

The drive belt structure of the present invention is extremely simple and economical while yet providing a highly improved, ravel-free drive belt having long, trouble-free life.

BRIEF DESCRIPTION OF THE DRAWING

Other features and advantages of the invention will be apparent from the following description taken in connection with the accompanying drawing wherein.

BEST MODE FOR CARRYING OUT THE INVENTION

Figure 1:
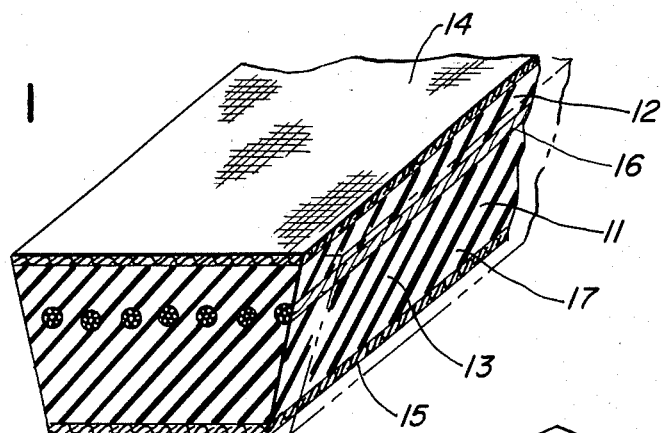
FIG. 1 is a fragmentary cross section perspective view of a drive belt embodying the invention.

In the illustrative embodiment of the invention as disclosed in the drawing, a drive belt comprises a rubber body 11 defining an outer tension section 12 and an inner compression section 13.

The tension section is provided with an outer cover fabric 14 and the compression section is provided with an inner cover fabric 15.

Intermediate the tension and compression sections, the belt body is provided with a plurality of longitudinally extending tensile strength cords 16. As shown in FIG. 1, the cords are disposed in parallel transversely spaced relationship.

In the embodiment of FIG. 1, the belt defines a V-belt having cut edge surfaces 17, thereby defining a raw edge belt wherein one or more of the tensile cords may be exposed at the side surfaces. As indicated briefly above, in the belt constructions of the prior art, there has been a tendency for the tensile cord fibers to ravel when so exposed. Such raveling has caused shortened life of the belt and presents a serious problem. The present invention comprehends the provision of a unique construction of the tensile cords which effectively eliminates such raveling in a novel and simple manner.

More specifically, the invention comprehends the provision of the tensile cords with a Lang twist wherein the ply twist constant is in the range of approximately 2.9 to 3.9 and the cable twist constant is approximately one-fifth to one-half of the ply twist constant.

The Lang twist comprises a combination of ply twists and cable twists which are effected in the same direction. The invention comprehends the preselection of the range of twisting parameters, as discussed above, so as to provide desired flexibility and ravel prevention characteristics of the tensile cords without sacrifice of strength and elongation at break so that the tensile cords are advantageously adapted for use in drive belts, such as power transmission belts, timing belts, and the like.

proved characteristics of the V-belt construction illustrated in FIG. 1.

The improved characteristics of the belt constructions obtained by utilizing tensile cords within the scope of the invention are illustrated in the following tables.

TABLE 1

|  | Cord No. 1 | Cord No. 2 | Cord No. 3 | Cord No. 4 | Cord No. 5 | Cord No. 6 | Cord No. 7 | Cord No. 8 | Cord No. 9 |
| --- | --- | --- | --- | --- | --- | --- | --- | --- | --- |
| Twisting | Plied Twist | Lang Twist | Single Twist | Lang Twist | Lang Twist | Lang Twist | Lang Twist | Lang Twist | Lang Twist |
| Ply Twist Constant | 3 | 2 | 3 | 3 | 3 | 3 | 3.6 | 3 | 4 |
| Cable Twist Constant | 3 | 0.5 | 0 | 0.75 | 1 | 1.5 | 1.8 | 3 | 2 |

In one preferred embodiment, the ply twist constant was 3 and the cable twist constant was approximately 1. The fibers were formed of aromatic polyamide, commonly sold in the United States under the trademark Kevlar ®. The invention comprehends that the tensile cords may alternatively be formed of glass fibers, polyester synthetic resin fibers, nylon fibers, etc.

The invention further comprehends the subjection of the twisted cord structure to a solution of resorcinol,

TABLE 2

| RFL Solution | |
| --- | --- |
| Chloroprene latex rubber | 100 |
| Resorcinol | 14.6 |
| Formalin | 9.2 |
| NaOH | 1.5 |
| Water | 262.5 |
| Total | 387.8 |

TABLE 3

|  | Cord No. 1 | Cord No. 2 | Cord No. 3 | Cord No. 4 | Cord No. 5 | Cord No. 6 | Cord No. 7 | Cord No. 8 | Cord No. 9 |
| --- | --- | --- | --- | --- | --- | --- | --- | --- | --- |
| Strength (kg) | 358 | 382 | 336 | 362 | 371 | 352 | 343 | 300 | 260 |
| Elongation at Break (%) | 4.5 | 4.3 | 4.3 | 4.3 | 4.4 | 4.9 | 5.0 | 6.7 | 6.8 |
| Elongation at 100 kg (%) | 1.67 | 1.62 | 1.72 | 1.75 | 1.81 | 1.92 | 2.05 | 2.23 | 2.43 | formalin, and chloroprene latex rubber. The cords may be subjected to a pretreatment of such a solution followed with a final immersion in the solution. Alternatively, the cords may be subjected to a pretreatment with an epoxy synthetic resin or an isocyanate compound prior to immersion in the RFL solution. Any suitable method of subjecting the cords to the pretreatment and treatment solutions may be used within the scope of the invention.

Figure 2:
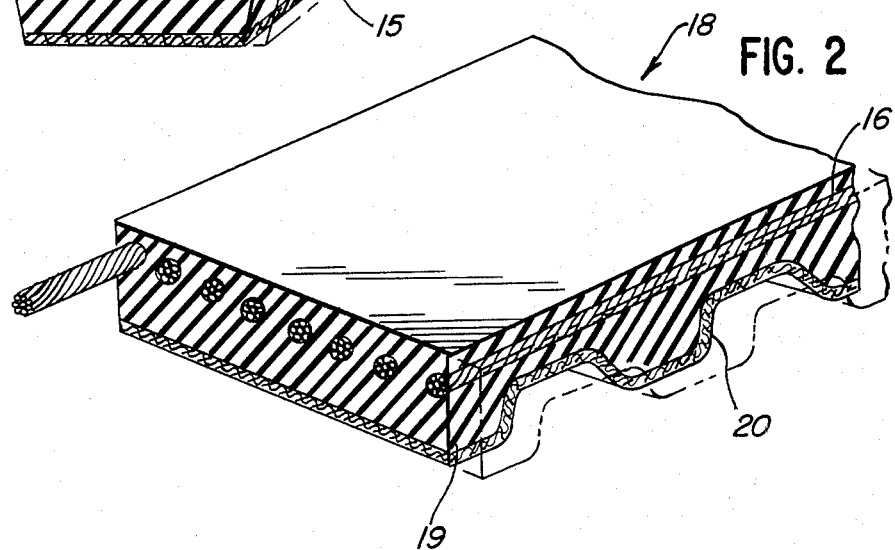
FIG. 2 is a fragmentary cross section perspective view of a cog-type drive belt embodying the invention.

The invention, as indicated briefly above, is advantageously adapted for use in timing belts, such as timing belt 18 illustrated in FIG. 2, wherein the compression section 19 defines a plurality of cogs 20. The tensile cords 16 provide improved, long life characteristics of the cog-type timing belt of FIG. 2 similar to the im-

TABLE 4

| Composition of Rubber Compound | |
| --- | --- |
| Chloroprene rubber | 100 |
| Magnesia | 4 |
| ZnO | 15 |
| Vulcanization accelerator | 2 |
| Sulfur | 0.5 |
| Antioxidant | 2 |
| Carbon black | 65 |
| Oil | 8 |

TABLE 5

|  | Cord No. 1 | Cord No. 2 | Cord No. 3 | Cord No. 4 | Cord No. 5 | Cord No. 6 | Cord No. 7 | Cord No. 8 | Cord No. 9 |
| --- | --- | --- | --- | --- | --- | --- | --- | --- | --- |
| Strength Retaining Ratio (%) | 22.2 | 41.2 | 31.6 | 45.1 | 52.6 | 58.9 | 60.3 | 61.2 | 67.2 |

TABLE 6

|  | Cord No. 1 | Cord No. 2 | Cord No. 3 | Cord No. 4 | Cord No. 5 | Cord No. 6 | Cord No. 7 | Cord No. 8 | Cord No. 9 |
| --- | --- | --- | --- | --- | --- | --- | --- | --- | --- |
| Degree of Raveling | 1 | 2 | 2 | 3 | 4 | 5 | 5 | 5 | 5 |

More specifically, tensile cords formed of Kevlar ® aromatic polyamide fibers having a 1500 D/4×3 structure were formed having different twists, as indicated in Table 1. Each of the tensile cords was immersed in an RFL solution having a composition as indicated in Table 2. After immersion, the coated cords were dried at 200° C. for 3 minutes. The cords were then subjected to strength and elongation tests, as indicated in Table 3. As shown, tensile cords 4, 5, 6, and 7 manufactured in accordance with the present invention, showed superior strength and elongation characteristics.

In a second experiment, the cords of Table 1 were embedded in a chloroprene rubber body by winding a pair of the cords of each type over a 1 mm thick layer of chloroprene rubber compound, as indicated in Table 4, supported on a drum. An outer layer of chloroprene rubber compound of the same characteristics was laminated onto the cords and first rubber layer. The resulting sandwich of rubber and embedded cords was subjected to a steam curing operation at 8 kg/cm² for 30 minutes.

Figure 3:
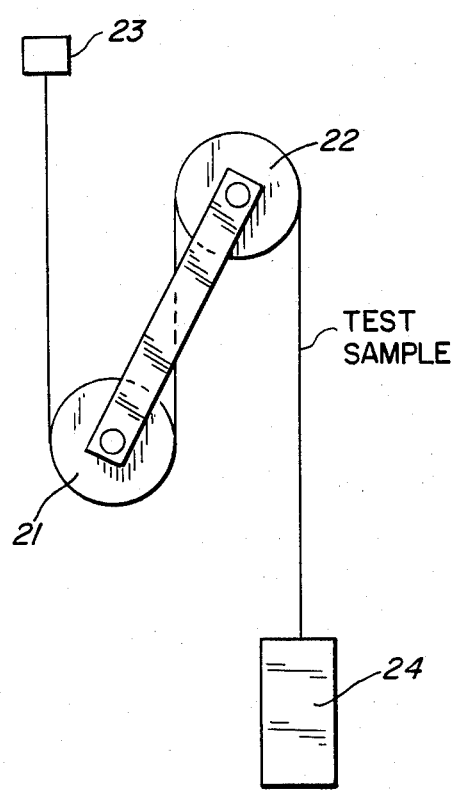
FIG. 3 is a schematic diagram illustrating a method of testing the strength of different tensile cord constructions in obtaining data as set forth in the specification.

The sandwich test samples were then tested by an apparatus, as illustrated in FIG. 3, and found to have strength-retaining ratios as indicated in Table 5. More specifically, as shown in FIG. 3, the samples were extended about cylinders 21 and 22, with one end of the sample secured to a support 23 and the other end of the sample carrying the weight 24. The cylinders were vertically reciprocated for 5,000 cycles to effect a repetitive flexing of the samples, with the weight 24 constituting a 2-kg weight.

After subjecting the samples to the flexing action, they were measured as to their strength-retaining ratio at a tension rate of 50 mm per minute.

The flexed samples were then cut transversely to the tensile cords to exposed cut cross sections thereof. The cut cross section was rubbed 10 times with a sharp razor blade and the degree of raveling of the cords, ranked on 5-point basis, wherein the highest number represents the least tendency to ravel. The results of the ravel test are illustrated in Table 6.

Thus, it was found that the tensile cords manufactured in accordance with the present invention effectively minimized the tendency of the cords to ravel while yet maintaining high strength, excellent elongation characteristics, and strength-retaining ratio characteristics. These characteristics were provided with constructions providing excellent flexibility.

Thus, the belt construction of the present invention provides highly improved belt performance and long troublefree life in a novel and simple manner.

The foregoing disclosure of specific embodiments is illustrative of the broad inventive concepts comprehended by the invention.

We claim:

1. In a drive belt having a belt body, the improvement comprising
   a plurality of Lang-twisted, fiber tensile cords extending longitudinally in the belt body, the cords having a ply twist constant in the range of approximately 2.9 to 3.9 and a cable twist constant of less than the ply twist constant.

2. The drive belt of claim 1 wherein said cords are formed of aromatic polyamide synthetic resin fibers.

3. The drive belt of claim 1 wherein said cords are formed of glass fibers.

4. The drive belt of claim 1 wherein said cords are formed of polyester synthetic resin fibers.

5. The drive belt of claim 1 wherein said cords are formed of nylon fibers.

6. The drive belt of claim 1 wherein said cords are provided with an outer coating comprising a mixture of chloroprene latex, resorcinol and formalin.

7. The drive belt of claim 1 wherein said cords are provided with a first coating of an epoxy synthetic resin and a second, outer coating comprising a mixture of chloroprene latex, resorcinol and formalin.

8. The drive belt of claim 1 wherein said cords are provided with a first coating of an isocyanate compound and a second, outer coating comprising a mixture of chloroprene latex, resorcinol and formalin.

9. In a drive belt having a belt body, the improvement comprising:
   a plurality of Lang-twisted, fiber tensile cords extending longitudinally in the belt body, the cords having a ply twist constant in the range of approximately 2.9 to 3.9 and a cable twist constant of less than the ply twist constant; and
   a coating of adhesive material on said cords providing high adhesion of the cords to said belt body.

10. The drive belt of claim 9 wherein said cords are formed of aromatic polyamide synthetic resin fibers.

11. The drive belt of claim 9 wherein said adhesive material includes a resorcinol component.

12. The drive belt of claim 9 wherein said adhesive material includes a formalin component.

13. The drive belt of claim 9 wherein said adhesive material includes a latex component.

14. The drive belt of claim 9 wherein said adhesive material includes a chloroprene latex component and said belt body is formed of chloroprene latex.

15. In a drive belt having a rubber belt body, the improvement comprising
   a plurality of Lang-twisted, fiber tensile cords formed of aromatic polyamide synthetic resin extending longitudinally in the belt body, the cords having a ply twist constant in the range of approximately 2.9 to 3.9 of less than the ply twist constant and having an outer adhesive coating for enhancing bonding of the cords to the rubber belt body.

16. The drive belt of claim 15 wherein said outer adhesive coating comprises a mixture of resorcinol, formalin, and latex.

17. The drive belt of claim 15 wherein said drive belt comprises a V-belt.

18. The drive belt of claim 15 wherein said drive belt comprises a cog timing belt.

19. The drive belt of claim 15 wherein said drive belt comprises a ribbed belt.

20. The drive belt of claim 15 wherein said cords are provided with a pretreatment coating onto which an adhesive coating is provided.

21. The drive belt of claim 15 wherein said ply twist constant is approximately 3 and said cable twist constant is approximately 1.

22. The drive belt of claim 1 wherein the cords have a cable twist constant in the range of approximately 0.20 to 0.50 the ply twist constant.

23. The drive belt of claim 9 wherein the cords have a cable twist constant in the range of approximately 0.20 to 0.50 the ply twist constant.

24. The drive belt of claim 15 wherein the cords have a cable twist constant in the range of approximately 0.20 to 0.50 the ply twist constant.

* * * * *